Patented Feb. 7, 1939

2,146,473

UNITED STATES PATENT OFFICE 2,146,473

PREPARATION OF β-(P-HYDROXYPHENYL)-ISOPROPYLMETHYLAMINE

Gustav Hildebrandt, Mannheim, Germany, assignor to E. Bilhuber Inc., Jersey City, N. J.

No Drawing. Application May 24, 1937, Serial No. 144,545. In Germany May 26, 1936

3 Claims. (Cl. 260—574)

The present invention relates to an improved method for the preparation of β-(p-hydroxyphenyl)-isopropylmethylamine.

It has already been proposed to prepare β-(p-methoxyphenyl)-isopropylmethylamine by condensing β-(p-methoxyphenyl)-isopropylamine with benzaldehyde to the corresponding Schiff's base, treating the latter with methyl iodide or a similar compound and hydrolyzing the resulting addition product with aqueous acid. The β-(p-methoxyphenyl)-isopropylmethylamine so obtained can be converted by demethylation into β-(p-hydroxyphenyl)-isopropylmethylamine.

According to this invention it has been found that β-(p-hydroxyphenyl)-isopropylmethylamine can be prepared in a substantially more simple manner by treating β-(p-hydroxyphenyl)-isopropylamine with known methylating agents.

Owing to the employment of the base not substituted at the OH group subsequent elimination of the methoxy group is no longer necessary. The process of this invention also offers the advantage that fewer working stages are necessary for the preparation of the β-(p-hydroxyphenyl)-isopropylmethylamine than are required in the known processes. With a suitable methylating agent the preparation may even be effected in only one stage.

The process of this invention may be carried into effect by treating the β-(p-hydroxyphenyl)-isopropylamine with the most varied methylating agents. The methylation is however preferably effected with formaldehyde and hydrogen. Other known methylating agents, for example benzaldehyde together with methyl iodide, or dimethyl sulfate, may however also be employed.

Examples 1. 15.1 gms. of β-(p-hydroxyphenyl)-isopropylamine are heated for one hour with 11 gms. of benzaldehyde on a water bath. The resulting Schiff's base is dissolved in benzol and the benzol solution is dried and heated for 5 hours with 15 gms. of methyl iodide in a closed tube in a water bath. The precipitated conversion product is decomposed with hot water. After removing the benzaldehyde the product is evaporated in vacuo. On precipitation with ammonia β-(p-hydroxyphenyl)-isopropylmethylamine is obtained in the form of a colourless, crystalline powder of melting point 163° C.

2. 100 gms. of β-(p-hydroxyphenyl)-isopropylamine, 250 ccs. of alcohol and the calculated quantity of formaldehyde solution are mixed together and stirred for 6 hours in the warm with 70 gms. of activated aluminum turnings. After filtering and evaporating the solution in vacuo, the residue is dissolved in alcohol and the solution is treated with the calculated quantities of dilute sulphuric acid, whereupon the sulfate of β-(p-hydroxyphenyl)-isopropylmethylamine is precipitated, from which the free base of melting point 163° C. can be recovered.

What I claim is:

1. A process for the preparation of β-(p-hydroxyphenyl)-isopropylmethylamine which consists in methylating β-(p-hydroxyphenyl)-isopropylamine.

2. A process for the preparation of β-(p-hydroxyphenyl)-isopropylmethylamine which consists in condensing β-(p-hydroxyphenyl)-isopropylamine with formaldehyde and reducing the double bond of the nitrogen atom of the resulting condensation product to form the corresponding saturated amine.

3. A process for the preparation of β-(p-hydroxyphenyl)-isopropylmethylamine which consists in condensing β-(p-hydroxyphenyl)-isopropylamine with formaldehyde and reducing the resulting condensation product with nascent hydrogen.

GUSTAV HILDEBRANDT.